A. B. LANDIS.
CUTTER HEAD.
APPLICATION FILED MAR. 4, 1910.
1,017,888.
Patented Feb. 20, 1912.
4 SHEETS—SHEET 1.
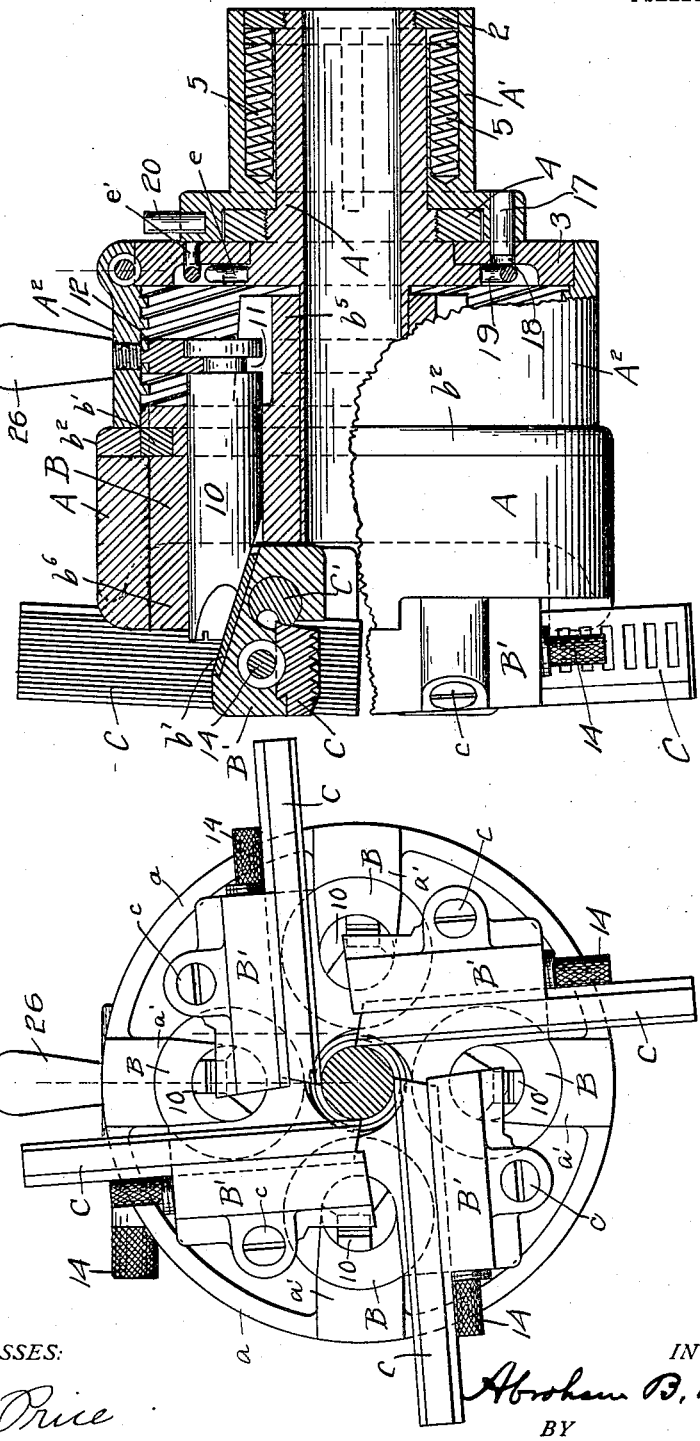
WITNESSES:
INVENTOR.
Abraham B. Landis,
BY
ATTORNEY.

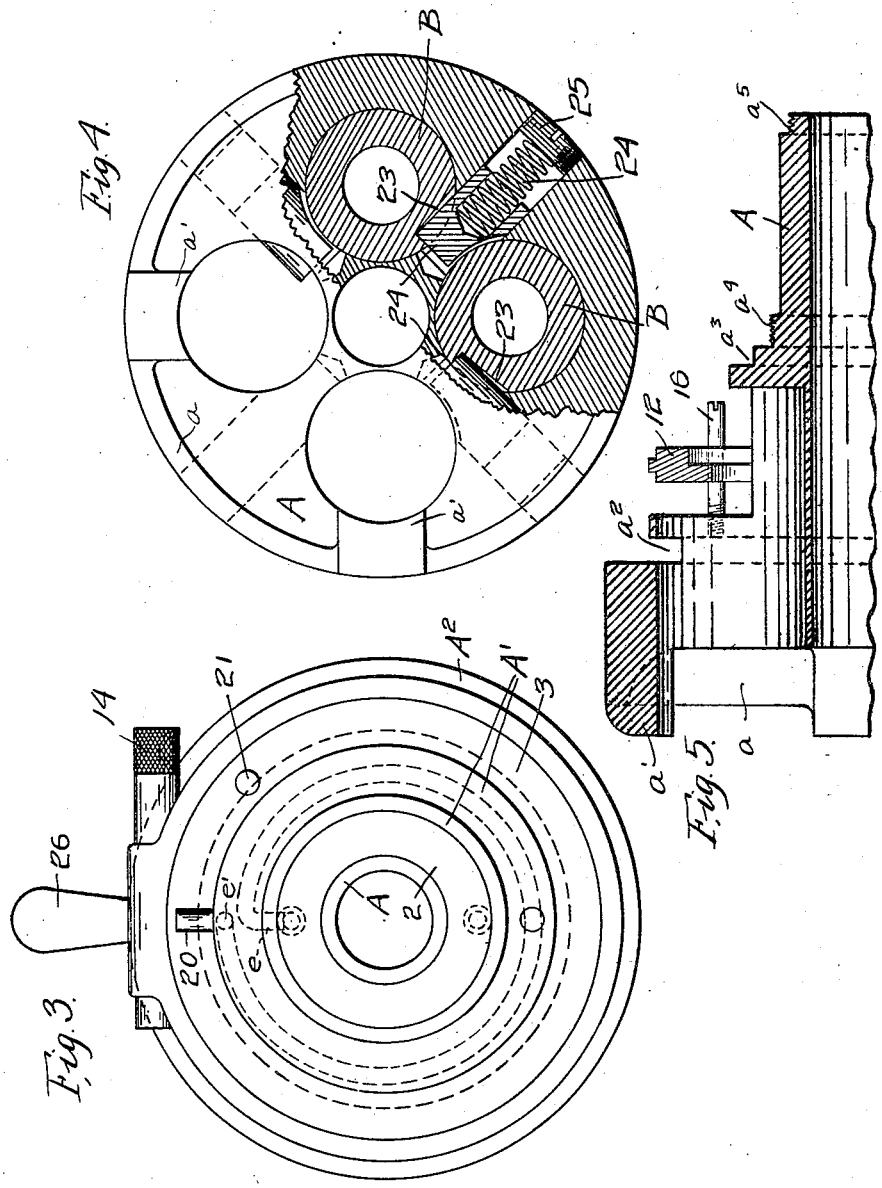

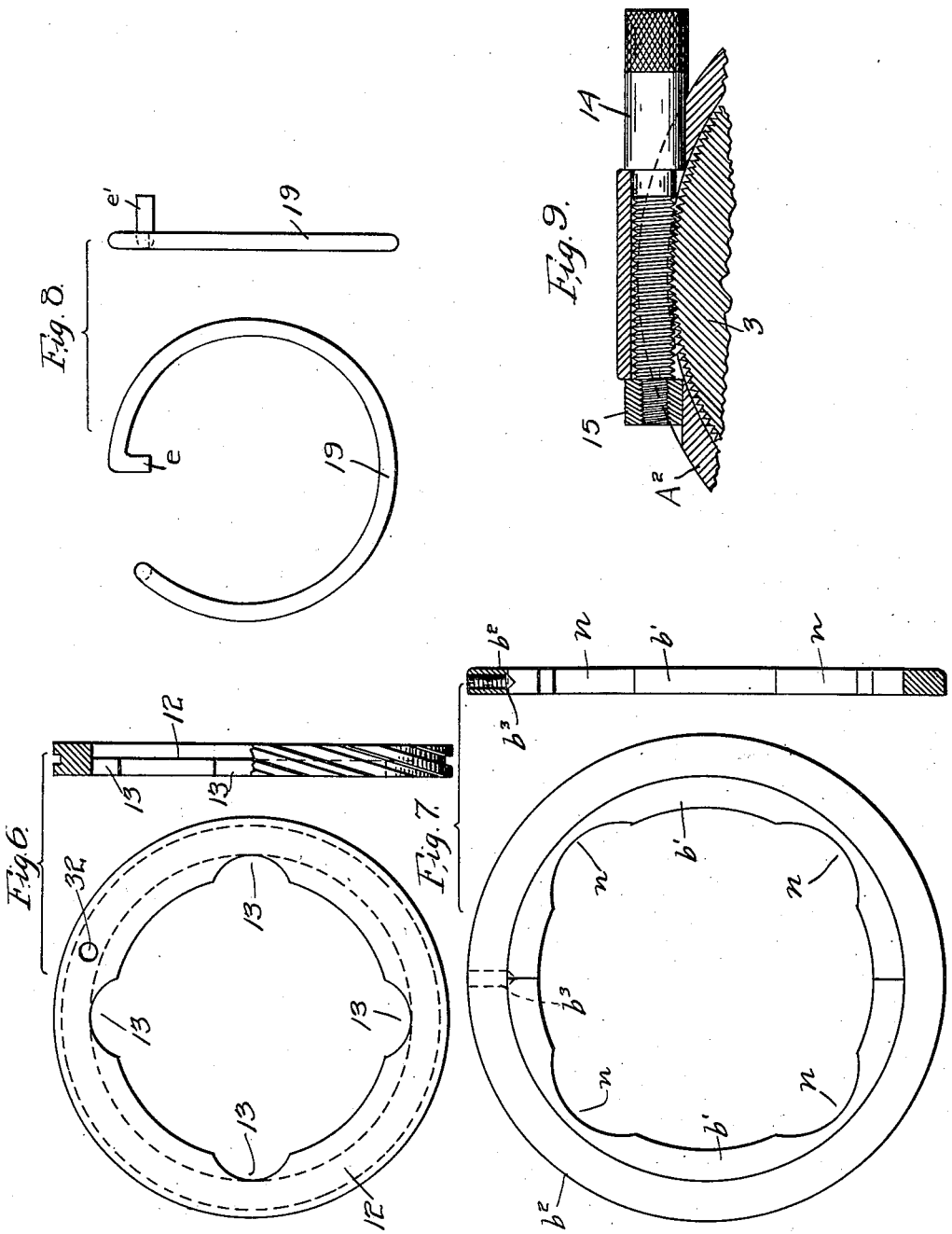

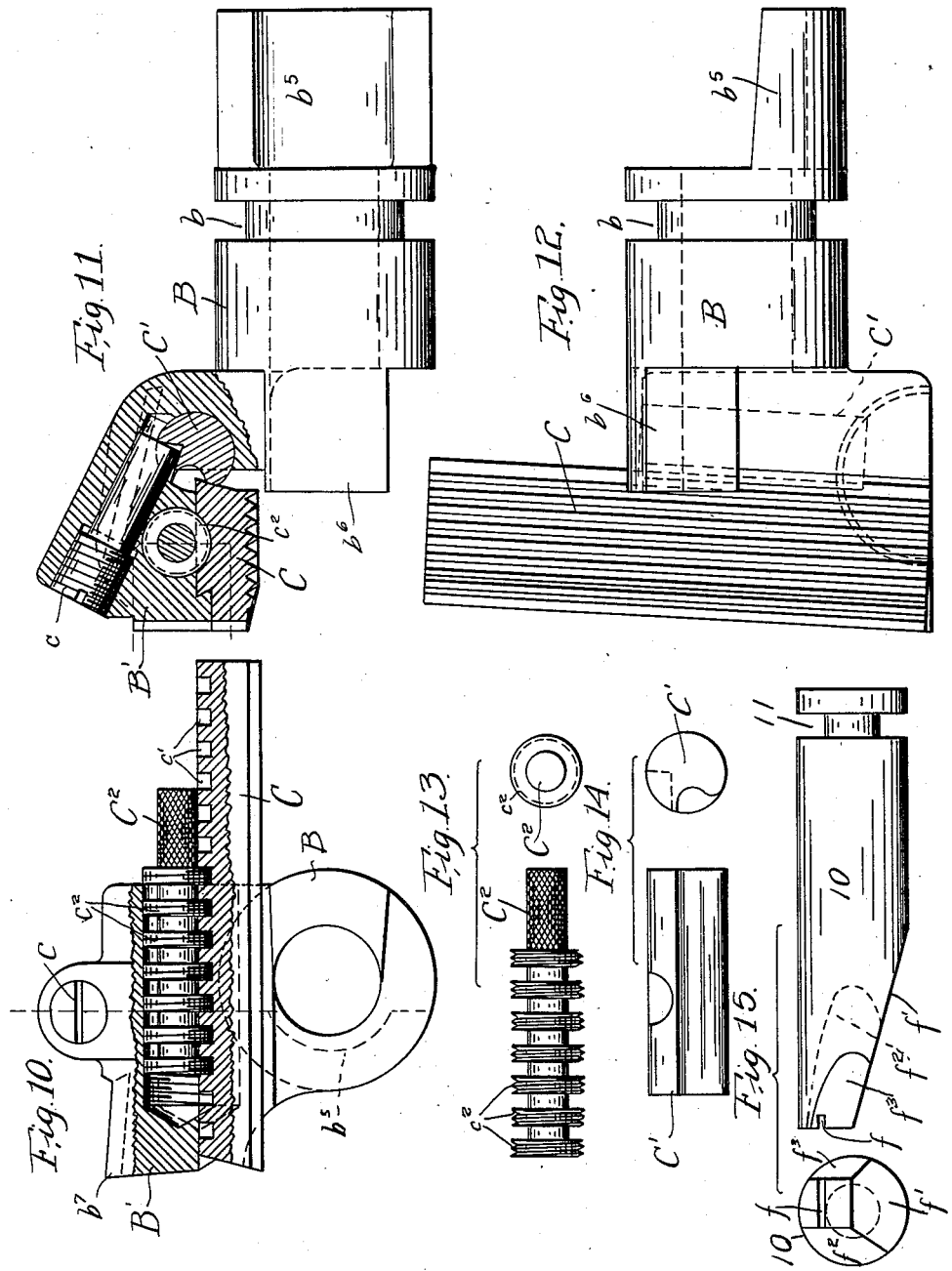

UNITED STATES PATENT OFFICE.

ABRAHAM B. LANDIS, OF WAYNESBORO, PENNSYLVANIA.

CUTTER-HEAD.

1,017,888.  Specification of Letters Patent. Patented Feb. 20, 1912.

Application filed March 4, 1910. Serial No. 547,250.

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads, of which the following is a specification.

My said invention consists in various improvements in the details of construction and arrangement of parts of cutter-heads designed for use on a screw-cutting machine, whereby such a head is provided that is very compact and of a rigid and secure structure and one that is readily and conveniently adjusted to various sizes and may be quickly and conveniently opened and closed, all as will be hereinafter more fully described and claimed.

Referring to the accompanying drawings which are made a part hereof and on which similar reference characters indicate similar parts, Figure 1 is a front elevation of a cutter-head embodying my said invention, Fig. 2 a view principally in central longitudinal section through the same, but showing a portion of the casing in elevation, Fig. 3 a rear elevation, Fig. 4 a view partly in front elevation and partly in cross section, Fig. 5 a detail longitudinal section on the dotted line 5—5 in Fig. 4, Figs. 6, 7, 8 and 9 detail views illustrating the parts separately, Fig. 10 a view of the cutter-holder partly in front elevation and partly in section, Fig. 11 a view of said cutter-holder partly in side elevation and partly in section, Fig. 12 an underside plan view of said cutter-holder, and Figs 13, 14 and 15 detail views illustrating different parts separately.

In said drawings the portions marked A represent the body, or frame, of the cutter-head, B the cutter-holders mounted therein and C the cutters.

The body, or frame A, is of a form best indicated by Figs. 1, 4 and 5. In Fig. 5 the particular form is most clearly illustrated. It comprises a casting of suitable size and dimensions for the purpose, having a central aperture and a series of apertures arranged equi-distant around said central aperture forming the journals for the trunnions of the cutter-holders. Its forward end is formed with a flange $a$ surrounding its outer edge and with a series of overhanging projections $a'$ arranged one opposite the axis of each of the bearings for the several cutter-holders, for a purpose to be presently described. It is formed with an annular groove $a^2$ at a point near its front and with a series of shoulders $a^3$, $a^4$ and $a^5$ at different points throughout its length. The shoulder $a^5$, at its extreme rear end, is formed screw-threaded and has a disk 2 mounted thereon. An annular plate or disk 3 is mounted on shoulder $a^3$ and a collar 4 is screw-threaded onto shoulder $a^4$ to hold said disk in place. A sleeve A' is mounted on the rear end of the body A formed with a shouldered front end adapted to fit against the front face of collar 4 and surround its edge bearing against the outer face of disk 3. Coiled springs 5 are mounted in recesses in said sleeve A' being interposed between collar 2 on the outer end of body A and the inner end of said recesses. Said springs tend to force the body A rearwardly so that the shoulder adjacent to the front end of said sleeve will normally be in close contact therewith. Said sleeve A' is connected with the arbor or in a turret of the machine.

The cutter-holders B each comprise a trunnion having a cutter supporting head extending to one side of the axis thereof and formed with a suitable recess or seat to receive the cutters. Each trunnion is formed with a circumferential groove $b$ which is adapted to register with the groove $a^2$ in the body A when said trunnions are slid to position. A sectional ring $b'$ formed with segmental notches $n$ at appropriate intervals is adapted to slip over the ends of said trunnions and then be turned so that a portion between said notches will come into the groove $b$ and lock each trunnion from longitudinal movement. A solid ring $b^2$ is mounted around said ring $b'$ and a pointed screw $b^3$ is driven through a screw-threaded perforation in said ring $b^2$ with its point engaging in one of the joints between the adjacent ends of the sections of ring $b'$, serving to clamp said sections rigidly within said ring $b^2$ and also hold them with the wide portions in engagement with the grooves $b$ of the trunnions. By this means the trunnions of the several cutter-holders are secured in the body A and held against any longitudinal movement but permitted to rotate. Said trunnions are each formed with a bearing extension $b^5$ on its inner rear corner and with a bearing extension $b^6$ on its outer front corner, for a purpose to be presently described. Each of said trunnions is formed hollow, or with a longitudinal central perforation, in which is mounted a sliding plunger 10. Each plunger is formed with a circumferential groove 11 near its outer end. Another ring 12 formed with a series of segmental notches 13 is adapted to slip over the ends of said several plungers and be turned to bring the flange between the notches 13 into the grooves 11 so that the inner ends of said plungers are all connected to said ring 12. The periphery of said ring 12 is formed with spiral ribs, or threads, as shown most plainly in Fig. 6. A cylindrical nut, or casing, $A^2$ is mounted on body A, its front end resting upon the shoulder adjacent to the rear face of ring $b^2$, while its rear end engages the periphery of disk 3. Each of the trunnions B is cut-away on its rear outside corner, as best illustrated in Figs. 2 and 11, leaving only the inner portion $b^5$ of the trunnion to extend substantially the full length of the bearing in the body A. An annular chamber is thus formed surrounding the rear ends of said trunnions and inclosed by the cylinder $A^2$ in which the ring 12, engaging with the rear end of a plunger 10, is mounted. The inner surface of said cylinder $A^2$ is formed with threads which correspond to and engage with the threads on the periphery of ring 12. A transverse screw 14 is mounted in a transverse socket or housing formed on the top of cylinder $A^2$, being held from longitudinal movement therein by a nut 15 on one end and a shoulder near its opposite end, the nut bearing upon one end of the socket and the shoulder upon the other end, as shown most clearly in Fig. 9. The threads of said screw 14 engage with threads on the periphery of the disk 3 and by turning said screw it will operate to turn the cylinder $A^2$ and through the engagement between the threads and grooves of ring 12 and said cylinder will slide said ring and the plungers 10 with which it is connected. Said ring 12 is held from rotation by a pin 16 seated in body A and extending out therefrom to project through a perforation in said ring. Disk 3 is normally locked to the sleeve A', which is fast upon the spindle or turret of the machine, by means of a latch-pin 17 mounted in the flange of said sleeve and projecting into a perforation 18 in the adjacent face of said disk. A stiff coiled spring 19 is mounted in a recess in the inner face of disk 3 one end, $e$, of said spring being turned downwardly and engaged with a socket in the periphery of body A and the other end, $e'$, being turned outwardly to engage with a perforation in the face of said disk 3. Said spring is arranged so that its tension is directed to turn disk 3 and cylinder $A^2$ connected therewith to open the die when the latch-pin 17 is disengaged from the perforation 18 as will be presently described. A pin 20 is mounted in the periphery of the flange of sleeve A' adjacent to the face of disk 3 and another pin 21 is mounted in said disk 3 extending outwardly therefrom across the path of said pin 20.

In operation, when the die has cut to the limit of the movement for which it is set and the carriage stops, the further rotation of the work will draw the body A out of the sleeve A' until the latch-pin 17 is disengaged from the perforation 18, when spring 19 will expand and operate to throw disk 3 and cylinder $A^2$ around until the pin 21 contacts with the pin 20 and limits said movement. Said operation draws ring 12 and plungers 10 back and permits the die to open. Each of the trunnions B is also formed with a tangential notch 23 in its outer face with which the corner of a plunger 24 is adapted to engage. One of said plungers 24 is mounted in a socket between the adjacent sides of the several bearings for the trunnions, as best shown in Fig. 4. Said plungers slide radially in said sockets being held against the notches by coiled springs 24 bearing between said plungers and a screw-plug 25 in the outer end of each of said sockets. The inner ends of said plungers are formed with one corner square to engage the notch in the trunnion it is to operate against and the other corner concaved to escape the side of the adjacent trunnion. As soon as the latch-pin 17 is released and the spring 19 operates to turn the parts, these springs operating through said plungers 23 will also serve to turn each of the trunnions and throw the cutters outwardly to open the die. After the work has been removed and the carriage starts on its return the operator, by means of handle 26, turns cylinder $A^2$ against spring 19 contracting said spring and returning the aperture 18 to register with latch-pin 17. As soon as said latch-pin reaches the perforation, springs 5 operate to slide body A backward in sleeve A' bringing the face of the forward end of the flange of said sleeve and the rear face of disk 3 together and thus locking the die in closed position. The turning of cylinder $A^2$ also moves plungers 10 forward and closes the die ready for the next cutting operation.

The plungers 10 are formed as best shown in Fig. 15 with three different tapered faces on their front ends. One of said faces $f'$ tapers to the center of said plunger. Another $f^2$ tapers to a point a short distance from said center, while the other face $f^3$ is of a still shorter angle and tapers back to a point still farther from the center. A slot $f$ is formed in the front end of said plunger with which a screw-driver may be engaged to turn said plunger to bring either face desired into engagement with the back of the cutter-holder.

The cutter-holders B each have a cutter-holding head B' which projects to one side of the axis of the trunnion, as before stated, and at a point in line with the axis of the next adjacent trunnion each is formed with a tapered face in which a steel plate $b^7$ is seated to furnish a bearing for the plunger 10 mounted in the center perforation extending through said adjacent trunnion. It will thus be seen that the longitudinal adjustment of the plungers 10 will serve to adjust and fix the size of the die. When it is desired to adjust the die to any pre-determined size the screw 14 is turned to rotate cylinder $A^2$ in the appropriate direction, which, through its screw-threaded connection with ring 12, will slide the plunger 10 longitudinally in the appropriate direction to secure the desired adjustment. By bringing the different faces $f'$, $f^2$ and $f^3$ successively into engagement with the bearing plates $b^7$ the degree of adjustment in relation to the longitudinal movement of the plunger may be varied so that the space provided for the movement of ring 12 inside of cylinder $A^2$ can be comparatively short and enable the head to be made compact and of comparative small size. Where the adjustment required is but slight the long taper may be sufficient to effect the change desired. Where a greater change in size is required it may be necessary to bring one of the shorter angles into operation on the plate $b^7$. This can be readily done by turning plungers by means of a screw-driver inserted in the slot $f$, formed in each, the cutter-holders yielding by turning on their axis against the plungers 23 and springs 24 to permit the movement. Thus the fixed size of the die is secured by adjusting the position of ring 12 in cylinder $A^2$ while the opening and closing is accomplished by the turning of cylinder $A^2$ to slide ring 12 and the plungers 10 back and forth.

The forward ends of the trunnions B are formed with extensions $b^8$ on their outsides, opposite the axis from the work, and diametrically opposite the extensions on their inner ends, to give greater bearing surface against the strain of the work.

The cutters C are each of the form best illustrated in Figs. 10, 11 and 12 being formed with longitudinal cutting grooves upon their faces and with a cut-under, or dove-tail shaped shoulder near their outer corners on their backs, which shoulders engage under correspondingly formed tapered flanges $b^9$ on the outside corner of the recess formed in head B' to receive said cutters. The opposite, or inner, edge of said cutters is formed slightly tapered, as shown, its back edge somewhat overhanging its face. A cam cylinder C' is mounted in a perforation in the part B' extending in line with the inner edge of said cutters, the perforation cutting into the seat provided for said cutters, so that the cam face of each of said cylinders is adapted to bear against the tapered inner edge of the cutter it is designed to hold. A screw $c$ is mounted in a diagonally extending perforation in a socket $c^4$ and projects into the perforation provided for the cylinder C' its inner end engaging with a notch in one side of said cylinder. By the use of a screw-driver said screws $c$ may be driven into their cam faces firmly against the inner tapered edges of the cutters. This means serves to force said cutters not only outwardly but also to force them back firmly against the face of the seat, or recess, provided therefor in the head B', thus securing said cutters rigidly in position and in a manner which provides for their ready and convenient removal, or replacement. In the back of each of said cutters are formed a series of transverse notches $c'$ with which a series of annular collars $c^2$ on the adjusting screws $C^2$ are adapted to engage. Each of said adjusting screws $C^2$ is mounted in a perforation in the part B' which perforation cuts into the seat provided for the back of a cutter C. Said perforation is screw-threaded and the peripheries of the collars or rings $c^2$ are also screw-threaded and adapted to engage with the screw-threads of said perforation so that the turning of said screw $C^2$ will operate to adjust it longitudinally and carry with it the cutter C, which is engaged therewith by means of the transverse grooves in its back. When it is desired to remove a cutter the appropriate screw $c$ is backed so that cam C' may be turned to release the cutter from the engagement between said cam and the flange $b^9$ on the outer edge of the part B', which permits the cutter to be taken out and another put in, when the screw $c$ is turned up to force the cam over and clamp said cutter in place, as before. When it is desired to adjust the cutter longitudinally, screw $c$ is backed slightly so as to ease up the clamp sufficiently to permit said cutter to slide between the clamping face without being released from its seat, when by turning the screw $C^2$ in the appropriate direction said cutter may be adjusted as desired, when screw $c$ is again turned up to clamp the cutter in the adjusted position.

It will be noted by reference to Fig. 14 that the clamping cylinder C' is of considerable length extending approximately the entire length of the seat in the part B' thus affording a long bearing for the inner edge of the cutter corresponding to the bearing under flange $b^9$ for its outer edge and thus insuring that it shall be held in a very secure and rigid position.

By reason of the projecting flange $a$ around the body A and the projecting overhanging portions $a'$ in line with the axis of the several cutter-holder trunnions and holding plungers 10, a very rigid support is afforded for the die at a point nearly in line with the work thus permitting no expansion of the die to take place under the strain of the work and insuring a very accurate result.

Having thus fully described my said invention, what I claim as new and desire to secure by Letters Patent, is:

1. A cutter-head for screw-cutting machines comprising a body having sections overhanging the face thereof, bearings for the trunnions of the cutter-holders arranged around the axis of said body and in line with said overhanging sections, cutter-holders mounted in said bearings, cutters mounted in said cutter-holders, and means for opening and closing the die and securing said cutter-holders in desired relation comprising sliding plungers mounted in longitudinal perforations extending through the trunnions of the several cutter-holders and adapted to bear upon a face of an adjacent cutter-holder, substantially as set forth.

2. A cutter-head for screw cutting machines comprising a body formed with sections around its periphery overhanging its face, bearings for the trunnions of the cutter-holders arranged around the axis of said body and in line with said overhanging sections, cutter-holders mounted with their trunnions in said bearing, means for opening and closing the die and securing the cutter-holders in relative adjustment consisting of plungers mounted to slide longitudinally in perforations extending through the trunnions of the several cutter-holders being provided with tapered bearing faces adapted to engage therewith, and means for adjusting said plungers longitudinally, substantially as set forth.

3. A cutter-head for screw-cutting machines comprising a body formed with sections around its periphery which overhang its face, bearings for the cutter-holders arranged around the axis of said body and in line with said overhanging portions, cutter-holders formed with trunnions having overhanging extensions on their outer outside corners extending forward from the main body of the trunnion and adapted to bear beneath said overhanging portions of the body, cutters mounted in said cutter-holders, means for opening and closing the die comprising plungers mounted in longitudinal perforations in the trunnions in said cutter-holders, said plungers being arranged to bear upon the face of the adjacent cutter-holder on one side and under the overhanging portions of the trunnion and body on its other side, and means for securing said plungers, substantially as set forth.

4. A cutter-head for screw-cutting machines comprising a body formed with portions overhanging the face thereof, bearings for cutter-holder trunnions arranged around its axis and in line with said overhanging portions, cutter-holders with trunnions mounted in said bearings, said trunnions being formed with overhanging extensions on their outer ends adapted to bear under said overhanging portions of the body and with rearwardly projecting extensions on their inner ends adapted to extend the length of the bearing within the body on their inner faces, cutters mounted in said cutter-holders, plungers mounted in longitudinal perforations extending through said trunnions formed with tapered or cam faces adapted to engage with the faces on the adjacent cutter-holders for securing them in relative adjustment and means for holding and adjusting said plungers, substantially as set forth.

5. A cutter-head comprising a body formed with bearings for the cutter-holder trunnions arranged around its axis, cutter-holders mounted with their trunnions in said bearings, cutters mounted in said cutter-holders, and means for securing said cutters comprising a cam cylinder and a screw for adjusting said cam cylinder to throw its cam into clamping engagement with said cutters, substantially as set forth.

6. A cutter-head comprising cutter-holders having trunnion and heads extending to one side of said trunnions containing seats for the cutters, cutters mounted in said seats, means for securing said cutters in said seats comprising a rotary cylindrical cam, the cam face of which is arranged to impinge against one edge of said cutter and a screw extending transversely of said cam with its inner end arranged to engage with a notch therein for turning and holding said cam, substantially as set forth.

7. A cutter-head comprising a body, cutter-holders mounted around the axis thereof, cutters secured in seats in said cutter-holders, cam cylinders for clamping said cutters in their seats, means for operating and holding said cam cylinders consisting of screws mounted in sockets extending transversely of the cylinders and arranged with their inner ends to engage notches in said cylinders, and means for holding and adjusting said cutters longitudinally, substantially as set forth.

8. A cutter-head for screw-cutting machines comprising a body, cutter-holders mounted therein, cutters mounted in seats in said cutter-holders, means for holding said cutters in said seats, and means for holding and adjusting said cutters longitudinally comprising adjusting screws formed with a series of rings or collars rigid thereon and adapted to engage on one side with transverse notches, or grooves, in the back of the cutter and with screw-threads in the cutter-holder on the other side, substantially as set forth.

9. A cutter-head for screw-cutting machines comprising a body, cutter-holders mounted therein, cutters mounted in said cutter-holders, and means for holding and adjusting said cutters longitudinally comprising adjusting screws formed with circumferential rings or collars adapted to engage with transverse grooves, or notches, in the backs of the cutters, said collars or rings being formed with screw-threads on their peripheries and the perforation in which said grooves are mounted being formed screw-threaded, the threads on said collars or grooves engaging therewith, substantially as set forth.

10. A cutter-head for screw-cutting machines comprising a body formed with bearings around its axis for the trunnions of the cutter-holders, cutter-holders mounted in said bearings, cutters carried by said cutter-holders, means for opening and closing the die, means for holding the die in adjusted position and means for securing the trunnions of the cutter-holders from longitudinal movement comprising a ring mounted in a circumferential groove formed in the body with its inner edge engaging with grooves formed in said trunnions, substantially as set forth.

11. A cutter-head for screw-cutting machines comprising a body formed with bearings for the cutter-holders around its axis, cutter-holders mounted in said bearings, cutters mounted in said cutter-holders, means for opening and closing the die, means for adjusting and securing the die, and means for holding the trunnions from longitudinal movement comprising a divided ring mounted in a circumferential groove in the body with their inner edges engaging with grooves in said trunnions, and a solid ring surrounding said divided ring for holding the parts thereof in fixed relative position, substantially as set forth.

12. A cutter-head for screw-cutting machines comprising a body formed with bearings for the trunnions of the cutter-holders, cutter-holders mounted in said bearings, cutters mounted in said cutter-holder, means for holding said cutter-holders in fixed relation comprising sliding plungers, a ring engaging with the rear end of each of said sliding plungers, said ring being formed with spiral ribs or threads on its periphery, a cylinder surrounding said ring and formed with internal threads corresponding to and engaging with the threads on the periphery of said ring, and means for holding and adjusting said cylinder, substantially as set forth.

13. A cutter-head for screw-cutting machines comprising a body formed with bearings for the cutter-holder trunnions, cutter-holders mounted therein, cutters mounted on said cutter-holders, sliding plungers mounted in longitudinal perforations in the trunnions of the cutter-holders and formed with a tapered face adapted to engage with tapered faces on the adjacent cutter-holders, a ring engaging with the rear ends of each of said plungers, said ring being formed with a threaded periphery, a cylinder mounted on the body and formed with internal threads corresponding to and adapted to engage with the threads on the periphery of said ring, a transverse screw engaging with said cylinder and with a part fixed to said body, whereby said cylinder may be turned in relation to said body for adjusting said ring and said plungers, substantially as set forth.

14. A cutter-head comprising a body formed with bearings for the cutter-holder trunnions around its axis, cutter-holders mounted therein, cutters mounted on said cutter-holder, plungers mounted in longitudinal perforations extending through the trunnions of said cutter-holders and formed with tapered faces arranged to engage faces on the adjacent cutter-holders each of said plungers being formed at its rear end with a circumferential groove, a ring formed with a flange having cut-away sections at points corresponding with the location of said plungers and adapted to slide over the ends thereof and turn to bring the flange into the grooves of said plungers, means for securing said ring from rotation in relation to the body, a cylinder surrounding said ring and formed with threads engaging with threads in the periphery of said ring, and means for adjusting and securing said cylinder circumferentially, whereby said ring and said plungers are moved and secured longitudinally, substantially as set forth.

15. A cutter-head for screw-cutting machines comprising a body, cutter-holders mounted on trunnions adapted to rock in bearings in said body, radial spring pressed plungers adapted to engage with notches in said trunnions for normally holding them to open the die, cutters mounted in said cutter-holders, a sleeve for securing the head to the spindle or turret of the machine, said body being mounted to slide within said sleeve, springs arranged to hold said body back against the forward end of said sleeve, a rocking die controlling cylinder, a latch-pin mounted in one part and adapted to engage with the other for locking said cylinder and body together, a spring engaging at one end with the body and at the other end with the cylinder, and means for turning said part against the action of said spring, substantially as set forth.

16. A cutter-head comprising a body formed with bearings for the cutter-holder trunnions around its axis, cutter-holders mounted therein, cutters mounted on said cutter-holders, plungers mounted in longitudinal perforations extending through the trunnions of said cutter-holders, said plungers having a tapered face arranged to engage a face of the adjacent cutter-holder, and means for moving said plungers longitudinally to open and close the die, substantially as set forth.

17. A cutter-head comprising a body formed with bearings for the cutter-holder trunnions around its axis, cutter-holders mounted therein, cutters mounted on said cutter-holders, longitudinal perforations through the center of said cutter-holder trunnions, and means extending through said perforations to engage with the adjacent cutter-holders for controlling the die, substantially as set forth.

18. In a cutter-head, the combination, of pivoted cutter-holders, cutters in said holders, each of said holders being held in relation to the other holders by a part extending through the axis of the adjacent holder, and said part, substantially as set forth.

19. A cutter-head comprising pivoted cutter-holders arranged around the axis of the head, and a sliding part extending through the axis of each holder and engaging a face of the adjacent holder for controlling the die, substantially as set forth.

20. A cutter-head comprising a frame formed with bearings for the cutter-holder trunnions and with overhanging bearing sections projecting from its rim in line with said bearings, the cutter-holders mounted with their trunnions in said bearings, each of said trunnions being formed with an extension on its front end adapted to bear against the adjacent overhanging bearing section of the frame, the cutters on said cutter-holders, and means for operating the die, substantially as set forth.

21. A cutter-head comprising a frame formed with bearings for the cutter-holder trunnions and with overhanging bearing sections adjacent to said bearings, cutter-holders mounted with their trunnions in said bearings and formed with extensions on their outer sides adapted to bear against said overhanging bearing sections of said frame, sliding plungers mounted in central perforations extending through said trunnions the outer ends of which are adapted to bear under said extensions on one side upon a face of the adjacent cutter-holder on its opposite side, means for holding and adjusting said plungers, and cutters mounted on said cutter-holders, substantially as set forth.

22. A cutter-head comprising a frame having bearing sections extending beyond the face thereof and overhanging a portion of the cutter-holders, said cutter-holders mounted with their trunnions in bearings formed around the axis of said frame and having extensions on the outer sides of their front ends, sliding plungers mounted in longitudinal perforations in said trunnions and adapted to bear at their outer ends between said extensions on one side and by an angle bearing against the adjacent cutter-holder on the other side, cutters mounted on said cutter-holders, and means for adjusting and securing said plungers, substantially as set forth.

23. A cutter-holder for cutter-heads of screw-cutting machines provided with a trunnion having an extension bearing face on the outer side of its front end and another on the inner side of its inner end, said extensions being thus diametrically opposed to each other and arranged to receive the strain of the work, substantially as set forth.

In witness whereof, I have hereunto set my hand and seal at Washington, District of Columbia this 2nd day of March, A. D. nineteen hundred and ten.

ABRAHAM B. LANDIS. [L. S.]

Witnesses:
J. D. YOAKLEY,
E. W. BRADFORD.